(12) United States Patent
Matsushima

(10) Patent No.: US 6,271,302 B1
(45) Date of Patent: Aug. 7, 2001

(54) POLYACETAL RESIN COMPOSITION FOR FUEL-CONTACTING PARTS

(75) Inventor: Mitsunori Matsushima, Fuji (JP)

(73) Assignee: Polyplastics Co., Ltd. (JP)

(*) Notice: Subject to any disclaimer, the term of this patent is extended or adjusted under 35 U.S.C. 154(b) by 0 days.

(21) Appl. No.: 09/380,528

(22) PCT Filed: Jun. 12, 1998

(86) PCT No.: PCT/JP98/02589

§ 371 Date: Sep. 2, 1999

§ 102(e) Date: Sep. 2, 1999

(87) PCT Pub. No.: WO98/58022

PCT Pub. Date: Dec. 23, 1998

(30) Foreign Application Priority Data

Jun. 16, 1997 (JP) .................................... 9-158480

(51) Int. Cl.⁷ ................. C08J 3/00; C08K 3/34; C08K 3/40; C08L 75/00; C08L 61/02
(52) U.S. Cl. ............ 524/542; 524/492; 524/493; 524/494; 524/495; 524/496; 524/590; 525/399
(58) Field of Search ................... 524/492, 493, 524/494, 495, 496, 542, 590; 525/399

(56) References Cited

U.S. PATENT DOCUMENTS 5,641,830 * 6/1997 Nun et al. ........................... 524/542

FOREIGN PATENT DOCUMENTS

| 0 703 276 A2 | 3/1996 | (EP) . |
| 59-145244 | 8/1984 | (JP) . |
| 1-201356 | 8/1989 | (JP) . |
| 1-272656 | 10/1989 | (JP) . |
| 6-172612 | 6/1994 | (JP) . |
| 8-127701 | 5/1996 | (JP) . |

* cited by examiner

*Primary Examiner*—Patrick D. Niland
(74) *Attorney, Agent, or Firm*—Nixon & Vanderhye P.C.

(57) ABSTRACT

A polyacetal resin composition for fuel-related parts having an excellent creeping resistance, high conductivity and high thermal stability in the kneading or molding step is provided. The composition contains (A) a polyacetal resin, (B) glass fibers, (C) a conductive carbon and (D) a polyurethane resin, and has a volume resistivity of not higher than $1 \times 10^5$ Ωcm and, as the creeping resistance, such a tensile creep strength that it is not ruptured under a stress of 20 MPa in 60° C. water for at least 200 hours.

4 Claims, No Drawings

POLYACETAL RESIN COMPOSITION FOR FUEL-CONTACTING PARTS

BACKGROUND OF THE INVENTION

1. Technical Field

The present invention relates to a polyacetal resin composition for fuel-related parts comprising a polyacetal resin, glass fibers, a conductive carbon and a polyurethane resin, and having an excellent creeping resistance, a high conductivity and a high thermal stability in the kneading or molding step. It is also relates to fuel-related parts produced therefrom.

2. Background Art

A polyacetal resin is excellent in mechanical properties, fatigue resistance, friction and abrasion resistance, chemical resistance, oil resistance, thermal resistance and moldability. Therefore, it is used in a wide variety of fields such as automobiles, electrical and electronic equipment, other precision machines, and pipes for construction materials. As its use applications become wider, resin compositions having improved properties as materials are required and manufactured. As one of those resin compositions, a polyacetal resin containing a conductive carbon black for the purpose of giving conductivity thereto is used. For example, the polyacetal resins are used as fuel-related parts in consideration of their excellent chemical resistance. But in this case, since static electricity is generated by shearing of a fuel and the resin, the polyacetal resin is required to be conductive. Accordingly, the conductive carbon black is usually blended with the polyacetal resin.

However, the polyacetal resin has such a serious drawback that the blend of the carbon black noticeably decreases the toughness of the polyacetal resin. And so, when a pipe or the like as the above fuel-related part is continuously given a constant pressure or continuously loaded with a stress, a creep rupture occurs in a short period of time even if the stress is low.

On the other hand, in order to give the polyacetal resin both conductivity and a high mechanical strength, a surface-treated carbon fiber is added thereto. Such a polyacetal resin, however, cannot be used as general-purpose materials due to a highly increasing cost.

Therefore, there has been desired a polyacetal resin composition for fuel-related parts which can be manufactured at a low cost and which has a high conductivity, a high toughness, and in particular, an excellent creep resistance.

DISCLOSURE OF THE INVENTION

The present inventor has intensively investigated to obtain a polyacetal resin composition for fuel-related parts having excellent properties as described above. As a result, he has found that it is extremely effective to blend glass fibers, a conductive carbon and a polyurethane resin with a polyacetal resin and, in consequence, the present invention has been completed.

That is, the present invention relates to a polyacetal resin composition for fuel-related parts which is obtained by blending (A) a polyacetal resin with (B) glass fibers, (C) a conductive carbon and (D) a polyurethane resin, and which has a volume resistivity of $1 \times 10^5$ Ωcm or less and, as a creep resistance, such a tensile creep strength that it is not ruptured under a stress of 20 MPa in 60° C. water for at least 200 hours.

In a word, the present invention relates to the composition containing the above-described (A), (B), (C) and (D) and having the volume resistivity and the tensile creep strength as described above, and the fuel-related parts produced therefrom.

DETAILED DESCRIPTION OF THE INVENTION

The constitutional components of the present invention will be described hereinafter.

The polyacetal resin (A) according to the present invention is a polymer having oxymethylene groups ($-CH_2O-$) as the main repeating unit, and such a polyacetal resin includes polyoxymethylene homopolymers and polyacetal copolymers. The copolymers contain, other than the oxymethylene groups, oxyalkylene groups having about 2 to 6 carbon atoms, preferably about 2 to 4 carbon atoms (e.g., an oxyethylene group ($-CH_2CH_2O-$), an oxypropylene group, an oxytetramethylene group or the like). The content ratio of the oxyalkylene units having about 2 to 6 carbon atoms can be suitably selected in accordance with the application of the polyacetal, for example, 0.1 to 30 mol %, preferably 1 to 20 mol % based on the total polyacetal.

The polyacetal copolymer can be constituted of a plurality of components such as a copolymer consisting of two components and a terpolymer consisting of three components, and it may be a block copolymer. The polyacetal resin may be not only a linear one but one having a branched or cross-linked structure. Further, the terminals of the polyacetal resin may be stabilized by esterification with carboxylic acids such as acetic acid, propionic acid and butyric acid. The degrees of polymerization, branching and cross-linking of the polyacetal resin are not particularly restricted so long as the resin is meltable and moldable.

Preferable polyacetal resins include polyoxymethylene homopolymers and polyacetal copolymers (e.g., a copolymer comprising at least both an oxymethylene unit and an oxyethylene unit). Preference is given to the polyacetal copolymers from the standpoint of thermal stability.

A molecular weight of the aforesaid polyacetal resin is preferably as large as possible. The larger the molecular weight is, the more the creep resistance improves. Concretely, it is preferred that a melt index at 190° C. of the resin is not more than 9.0 g/10 min.

The aforesaid polyacetal resin can be produced by a conventional method, for example, by polymerizing aldehydes such as formaldehyde, paraformaldehyde and acetaldehyde, and cyclic ethers such as trioxane, ethylene oxide, propylene oxide and 1,3-dioxolane.

The glass fibers (B) usable in the present invention are not particular restricted. In view of handling, a chopped strand being cut into approximately 2 to 8 mm lengths is preferable. The glass fiber having a diameter of usually 5 to 15 μm, preferably 7 to 13 μm can be suitably used.

As the glass fiber, it is also preferred to use a surface pre-treated one. As a material for the surface treatment, polyurethane resins or oligomers are preferred. Such surface treated glass fibers can be easily handled.

The conductive carbon (C) used in the present invention is not restricted to particular ones. Any of Ketchen Black, acetylene black, channel black or various furnace type conductive carbons having an average particle size of 1–500 mμ, preferably 10–100 mμ can be used.

The polyurethane resin (D) used in the present invention is a polymer or an oligomer having an urethane linkage in the main chain. Generally, in many cases, a reactive functional group such as a hydroxyl group is present at the end of the polymer chain or a functional group including a hydroxyl group is suspending from the main chain. The polyurethane resin includes, for example, thermoplastic polyurethanes prepared by reacting a polyisocyanate component such as aliphatic, alicyclic or aromatic polyisocyanates with a polyol component such as a lower molecular weight polyol component, e.g., aliphatic, alicyclic or aromatic polyols, polyether diols, polyester diols and polycarbonate diols. In the preparation of the polyurethane, use may be made of a chain elongating agent such as diols or diamines. Furthermore, polyurethane elastomers may also be included in the polyurethane resin. These polyurethane resins may be used alone or in combination of two or more of them.

In the present invention, an addition of such a polyurethane resin results in the improvement of melt stability and processability of the conductive polyacetal resin. That depresses the decomposition during the molding or processing and enhances mechanical strength and creep resistance.

The polyurethane resin may be not only linear but also blanched or cross-linked as long as it can maintain thermoplasticity. Among these polyurethane resins, preference is given to the polyurethane and the polyurethane elastomer which are produced by reacting a diisocyanate component with a diol component.

A molecular weight of the polyurethane resin is not restricted. For example, from oligomers having a molecular weight of at most 10,000 to polymers having a molecular weight of at least 100,000 can be uesd.

Examples of the diisocyanate component are aliphatic diisocyanates such as 1,6-hexamethylene diisocyanate, alicyclic diisocyanates such as isophorone diisocyanate, aromatic diisocyanates such as 2,4-toluene diisocyanate, 2,6-toluene diisocyanate and 4,4'-diphenylmethane diisocyanate, and others.

Examples of the diol component are $C_2$–$C_{10}$ alkylene diols, polyoxyalkylene glycols such as poly(oxyethylene) glycol, poly(oxypropylene)glycol, poly(oxytetramethylene) glycol or copolymer glycols thereof such as polyethylene oxide-polypropylene oxide block copolymer, etc., polyester diols such as a polyesterdiol which is produced by the condensation polymerization of $C_4$–$C_{12}$ aliphatic dicarboxylic acids, e.g., polyethylene adipate or polybutylene adipate containing terminal hydroxyl groups, with $C_2$–$C_{16}$ aliphatic diols, and others.

A polyurethane elastomer is more useful than a polyurethane resin for improving melt stability and processability of the conductive polyacetal resin. The polyurethane elastomer includes, for example, a polyurethane elastomer which is produced by reacting the aforesaid diisocyanate component with a diol component such as polyoxyalkylene glycols and polyester diols containing polyoxyalkylene glycol units.

These polyurethane resins may be previously added as a surface-treating agent for glass fibers (B).

It is important that the polyacetal resin composition for fuel-related parts of the present invention is prepared so as to have a volume resistivity of not higher than $1\times10^5$ Ωcm and, as the creep resistance, such a tensile creep strength that the resin composition is not ruptured under a stress of 20 MPa in water at 60° C. for at least 200 hours by comprising a polyacetal resin (A), glass fibers (B), a conductive carbon (C) and a polyurethane resin (D) described above.

As a preparation method of the aforesaid resin composition, there may be mentioned a method of blending 100 parts by weight of the polyacetal resin (A) with 5 to 20 parts by weight of the glass fibers (B), 5 to 20 parts by weight of the conductive carbon (C), and 0.01 to 10 part(s) by weight of the polyurethane resin (D) one another.

An amount of the glass fibers (B) to be added is preferably 5 to 20 parts by weight, more preferably 8 to 15 parts by weight. Within such an amount range, the creep resistance may be improved and the flowability and extrusion processability may become good.

An amount of the conductive carbon (C) to be added is preferably 5 to 20 parts by weight, more preferably 7 to 12 parts by weight. Within such an amount range, sufficient conductivity as well as good toughness and heat stability of the polyacetal resin may be obtained.

An amount of the polyurethane resin (D) to be added, which includes the amount of the polyurethane resin to be added as a surface treating agent for the glass fibers (B), is preferably 0.01 to 10 part(s) by weight, more preferably 0.01 to 3 part(s) by weight. Within such an amount range, melt stability and extrusion/molding processability of the conductive polyacetal resin are improved, and the foaming during the extrusion and formalin odor are not generated. The present resin composition can be used widely as fuel-related parts with its good mechanical strength and creep resistance.

Further, a stabilizing agent for improving heat stability is preferably added to the present resin composition.

Optionally, one or more of the usual additives such as UV absorbents, lubricants, mold releasing agents, colorants including dyes and pigments and surface active agents can be added, if necessary.

The composition of the present invention may be easily prepared by the known conventional methods generally used as a method for the preparation of the resin composition. For example, a method wherein the components are mixed with each other and then kneaded and extruded in an extruder to prepare pellets; a method wherein pellets having different compositions are prepared, and then they are mixed with each other in a predetermined ratio and subjected to molding to obtain a molded product having a desired composition; a method wherein one or two or more of the components are directly charged in a molding machine. Any of these methods may be used.

The polyacetal resin composition for fuel-related parts of the present invention is applied with conductivity and high creep resistance besides the chemical resistance, which a polyacetal resin originally has, so that it can be widely used for various fuel-related parts, and it is also improved on melt stability and extrusion/molding processability by the addition of a polyurethane resin.

EXAMPLES

The present invention will be further elucidated on the basis of the following Examples and Comparative Examples, but the scope of the present invention shall not be limited to these Examples.

Examples 1 to 7 and Comparative Examples 1 to 5

A polyacetal resin (A), glass fibers (B), a conductive carbon (C) and a polyurethane resin (D), whose types and amounts are indicated in Tables 1 and 2, were mixed with each other and melt kneaded in a 30 mm twin-screw extruder at 190° C. to prepare pellets which were then evaluated.

The conductivity, creep resistance and mechanical properties of the molded articles were evaluated as follows:

Volume Resistivity

A disk-like test piece having a diameter of 100 mm and a thickness of 3 mm was used. Conductive paste was applied on both side of the disk, and dried. Then, volume resistivity was calculated by measuring electric resistance of the sample.

Creep Resistance

An ASTM D-638 test piece was used. A constant stress, 20 MPa, was applied on the sample in water at 60° C. The time needed to rupture the sample was determined.

Tensile Property

The determination was carried out according to ASTM D-638.

Moldability

Evaluation was carried out by the observation of foaming and formalin odor during the compounding in the following three levels.

⊚: Neither foaming nor formalin odor

○: No foaming but a little formalin odor

X: Foaming and heavy formalin odor

The following glass fibers, conductive carbons and polyurethane resins were used in the Examples and Comparative Examples:

(B) Glass Fiber (1) "Chopped Strand 3J-948"; trade name, manufactured by Nitto-Boseki Company (epoxy-treated glass fibers)

(2) "Glossrun Chopped Strand CS 03 JA FT102"; trade name, manufactured by Asahi Fiberglass Company (urethane-treated glass fibers)

(C) Conductive Carbon

"Ketchen Black ECX"; trade name, manufactured by Ketchen Black International Company (D) Polyurethane Resin Thermoplastic polyurethane ("Miractoran E375MSJP-1"; trade name, manufactured by Nippon Miractoran Co., Ltd.)

TABLE 1

| | | Example 1 | Example 2 | Example 3 | Example 4 | Example 5 | Example 6 | Example 7 |
|---|---|---|---|---|---|---|---|---|
| Amount (pts. wt.) | (A) Polyacetal Resin | 100 | 100 | 100 | 100 | 100 | 100 | 100 |
| | (B) Glass Fiber (1) | 8 | 12 | 15 | 12 | — | — | — |
| | (B) Glass Fiber (2) | — | — | — | — | 12 | 15 | 12 |
| | (C) Conductive carbon | 8 | 8 | 8 | 12 | 8 | 8 | 8 |
| | (D) Polyurethane Resin | 1 | 2 | 3 | 2 | — | — | 2 |
| | (D) Polyurethane Resin used as Surface Treatment Agent for (B) | — | — | — | — | (0.12) | (0.15) | (0.12) |
| Physical Properties | Volume Resistivity (Ω · cm) | $1.6 \times 10^4$ | $9.5 \times 10^2$ | $2.2 \times 10^2$ | $1.4 \times 10^2$ | $8.1 \times 10^2$ | $2.0 \times 10^2$ | $8.3 \times 10^2$ |
| | Creep resistance time (hr) | 250 | 300 | 350 | 250 | 300 | 330 | 310 |
| | Tensile Strength (MPa) | 67.7 | 72.5 | 75.9 | 71.4 | 75.1 | 78.2 | 77.3 |
| | Tensile Elongation (%) | 3.5 | 3.1 | 2.8 | 3.0 | 3.2 | 3.0 | 3.1 |
| | Moldability | ⊚ | ⊚ | ○ | ○ | ○ | ○ | ⊚ |

TABLE 2

| | | Comparative Example 1 | Comparative Example 2 | Comparative Example 3 | Comparative Example 4 | Comparative Example 5 |
|---|---|---|---|---|---|---|
| Amount (pts. wt.) | (A) Polyacetal Resin | 100 | 100 | 100 | 100 | 100 |
| | (B) Glass Fiber (1) | 8 | — | 8 | 12 | — |
| | (B) Glass Fiber (2) | — | — | — | — | 8 |
| | (C) Conductive carbon | — | 8 | 8 | 8 | — |
| | (D) Polyurethane Resin | 1 | 1 | — | — | 1 |
| | (D) Polyurethane Resin used as Surface Treatment Agent for (B) | — | — | — | — | (0.08) |
| Physical Properties | Volume Resistivity (Ω · cm) | $>10^{12}$ | $7.4 \times 10^5$ | $3.4 \times 10^4$ | $2.6 \times 10^3$ | $>10^{12}$ |
| | Creep resistance time (hr) | 270 | 80 | 120 | 150 | 270 |
| | Tensile Strength (MPa) | 70.0 | 58.1 | 62.2 | 64.1 | 72.1 |
| | Tensile Elongation (%) | 3.7 | 5.5 | 2.9 | 2.6 | 3.8 |
| | Moldability | ⊚ | ⊚ | x | x | ⊚ |

What is claimed is:

1. A polyacetal resin composition for fuel-related parts comprising:
   (A) 100 parts by weight of a polyacetal resin,
   (B) 5 to 20 parts by weight of glass fibers,
   (C) 5 to 20 parts by weight of conductive carbon, and
   (D) 0.01 to 10 parts by weight of a polyurethane resin, wherein said composition exhibits a volume resistivity of not higher than $1 \times 10^5$ $\Omega$cm and a creep resistance such that a test piece according to ASTM D-638 formed of the composition does not rupture under a stress of 20 MPa in 60° C. water for at last 200 hours.

2. The composition according to claim 1, wherein the glass fibers are pretreated with the polyurethane resin and have a diameter of 7 to 13 mm.

3. The composition according to claim 1, wherein the polyacetal resin has a melt index at 190° C. of not more than 9.0 g/10 min.

4. Fuel-related parts comprising the composition according to claim 1.

* * * * *